(12) United States Patent
Li

(10) Patent No.: US 9,256,028 B2
(45) Date of Patent: Feb. 9, 2016

(54) DISPERSION-CORRECTED ARRAYED WAVEGUIDE GRATING

(76) Inventor: Bing Li, Shanghai (CN)

( * ) Notice: Subject to any disclaimer, the term of this patent is extended or adjusted under 35 U.S.C. 154(b) by 135 days.

(21) Appl. No.: 13/996,451

(22) PCT Filed: Jan. 14, 2012

(86) PCT No.: PCT/CN2012/070357
§ 371 (c)(1),
(2), (4) Date: Jun. 20, 2013

(87) PCT Pub. No.: WO2012/095027
PCT Pub. Date: Jul. 19, 2012

(65) Prior Publication Data
US 2013/0294724 A1  Nov. 7, 2013

Related U.S. Application Data

(60) Provisional application No. 61/432,916, filed on Jan. 14, 2011.

(51) Int. Cl.
| | |
|---|---|
| *G02B 6/12* | (2006.01) |
| *G02B 6/14* | (2006.01) |
| *G02B 6/124* | (2006.01) |
| *G02B 6/28* | (2006.01) |

(52) U.S. Cl.
CPC ............ *G02B 6/12011* (2013.01); *G02B 6/124* (2013.01); *G02B 6/12014* (2013.01); *G02B 6/14* (2013.01); *G02B 6/2817* (2013.01)

(58) Field of Classification Search
None
See application file for complete search history.

(56) References Cited

U.S. PATENT DOCUMENTS

| | | | |
|---|---|---|---|
| 4,758,531 | A | 7/1988 | Beyer et al. |
| 4,929,302 | A | 5/1990 | Valette |
| 4,932,032 | A | 6/1990 | Koch et al. |
| 5,078,516 | A | 1/1992 | Kapon et al. |
| 5,220,296 | A | 6/1993 | von Flotow et al. |
| 5,285,514 | A | 2/1994 | Nojiri et al. |

(Continued)

FOREIGN PATENT DOCUMENTS

| | | |
|---|---|---|
| CN | 1411197 | 4/2003 |
| CN | 1512207 | 7/2004 |

(Continued)

OTHER PUBLICATIONS

Lui et al., "High-quality single-crystal Ge on insulator by liquid-phase epitaxy on Si substrates", Appl. Phys. Lett. vol. 84, No. 14, 2563, Apr. 5, 2004.

(Continued)

*Primary Examiner* — Jerry Rahll
(74) *Attorney, Agent, or Firm* — Vidas, Arrett & Steinkraus

(57) ABSTRACT

Techniques are described for forming an arrayed waveguide grating. In one example, an arrayed waveguide grating comprises a waveguide array coupled to the output of a parallel mode converter and a concave reflective diffraction grating coupled to the output of the waveguide array, wherein the waveguide array comprises a first waveguide and a second waveguide, wherein the first waveguide of the waveguide array has a different length from the second waveguide of the waveguide array. The waveguide array has a first dispersion having a first sign and a first magnitude, wherein the concave reflective diffraction grating has a second dispersion having a second sign and a second magnitude, wherein the second sign is opposite the first sign.

17 Claims, 5 Drawing Sheets

(56) References Cited

U.S. PATENT DOCUMENTS

| | | | |
|---|---|---|---|
| 5,355,422 A | 10/1994 | Sullivan et al. |
| 5,814,564 A | 9/1998 | Yao et al. |
| 5,963,688 A | 10/1999 | Campi et al. |
| 6,195,481 B1 | 2/2001 | Nakajima et al. |
| 6,278,820 B1 | 8/2001 | Hayes |
| 6,434,303 B1 | 8/2002 | Temkin et al. |
| 6,478,873 B1 | 11/2002 | Cheong et al. |
| 6,541,355 B2 | 4/2003 | Joo et al. |
| 6,654,729 B1 | 11/2003 | Hickman et al. |
| 6,749,893 B2 | 6/2004 | Ouellet et al. |
| 6,819,839 B2 | 11/2004 | Zheng et al. |
| 6,825,542 B2 | 11/2004 | Lam et al. |
| 6,870,152 B2 | 3/2005 | Ralph et al. |
| 6,956,983 B2 | 10/2005 | Morse |
| 6,991,892 B2 | 1/2006 | Block |
| 6,999,670 B1 | 2/2006 | Gunn, III et al. |
| 7,010,208 B1 | 3/2006 | Gunn, III et al. |
| 7,016,587 B2 | 3/2006 | Kubby et al. |
| 7,037,793 B2 | 5/2006 | Chien et al. |
| 7,049,218 B2 | 5/2006 | Choi et al. |
| 7,065,272 B2 | 6/2006 | Taillaert et al. |
| 7,065,273 B2 | 6/2006 | Bhowmik et al. |
| 7,068,885 B2 | 6/2006 | Bidnyk et al. |
| 7,088,890 B2 | 8/2006 | Liu |
| 7,120,350 B2 | 10/2006 | Block et al. |
| 7,136,544 B1 | 11/2006 | Gunn, III et al. |
| 7,149,387 B2 | 12/2006 | Balakrishnan et al. |
| 7,263,244 B2 | 8/2007 | Tanaka et al. |
| 7,289,698 B2 | 10/2007 | Deliwala |
| 7,352,926 B2 | 4/2008 | Spoonhower et al. |
| 7,418,166 B2 | 8/2008 | Kapur et al. |
| 7,453,132 B1 | 11/2008 | Gunn, III et al. |
| 7,474,973 B2 | 1/2009 | Goodwin |
| 7,483,455 B2 | 1/2009 | Hattori |
| 7,499,620 B2 | 3/2009 | Patel et al. |
| 7,539,373 B1 | 5/2009 | Logvin et al. |
| 7,570,365 B2 | 8/2009 | Trifonov et al. |
| 7,668,416 B2 | 2/2010 | Li |
| 7,807,523 B2 | 10/2010 | Liu et al. |
| 7,817,881 B2 | 10/2010 | Li |
| 7,978,941 B2 | 7/2011 | Li |
| 7,991,249 B2 | 8/2011 | Li |
| 8,078,020 B2 | 12/2011 | Rasras |
| 8,148,265 B2 | 4/2012 | Carothers et al. |
| 2001/0019644 A1 | 9/2001 | Nara et al. |
| 2002/0089721 A1* | 7/2002 | Nicolas .................. 359/128 |
| 2002/0110309 A1 | 8/2002 | Devaux et al. |
| 2002/0159684 A1 | 10/2002 | Sun et al. |
| 2002/0197016 A1 | 12/2002 | Chandrasekhar et al. |
| 2003/0052082 A1 | 3/2003 | Khan et al. |
| 2003/0108294 A1 | 6/2003 | Zheng |
| 2004/0208421 A1 | 10/2004 | Kitagawa |
| 2005/0053349 A1 | 3/2005 | Park et al. |
| 2005/0123242 A1 | 6/2005 | Walker et al. |
| 2006/0008223 A1 | 1/2006 | Gunn, III et al. |
| 2006/0110113 A1 | 5/2006 | Park et al. |
| 2006/0165341 A1 | 7/2006 | Yan et al. |
| 2007/0104411 A1 | 5/2007 | Ahn et al. |
| 2007/0116398 A1 | 5/2007 | Pan et al. |
| 2007/0189688 A1 | 8/2007 | Dehlinger et al. |
| 2007/0230854 A1 | 10/2007 | Felix Keil |
| 2007/0292073 A1 | 12/2007 | Li |
| 2008/0002928 A1 | 1/2008 | Li |
| 2008/0088354 A1 | 4/2008 | Mosinskis |
| 2009/0324164 A1 | 12/2009 | Reshotko et al. |
| 2011/0123153 A1 | 5/2011 | Nara |
| 2011/0164879 A1* | 7/2011 | Vasilyev et al. .................. 398/81 |

FOREIGN PATENT DOCUMENTS

| | | |
|---|---|---|
| CN | 101251559 | 8/2008 |
| CN | 101320111 | 12/2008 |
| EP | 0777139 | 6/1997 |
| JP | 11248949 | 9/1999 |
| JP | 2000131541 | 5/2000 |
| JP | 2009198594 | 9/2009 |

OTHER PUBLICATIONS

Assefa, Solomon et al, CMOS-integrated high-speed MSM germanium waveguide photodetector, Optics Express, Mar. 1, 2010, vol. 18, No. 5, pp. 4986-4999.

Fang, Q. et al, Low Loss (~6.45dB/cm) Sub-Micron Polycrystalline Silicon Waveguide Integrated with Efficient SiON Waveguide Coupler, Optics Express, Apr. 28, 2008, vol. 16, No. 9, pp. 6425-6432.

Beiju et al., "A High-Performance Silicon Electro-Optic Phase Modulator with a Triple MOS Capacitor," Chinese Journal of Semiconductors, vol. 27, No. 12, Dec. 2006, pp. 2089-2093.

Liao et al., "High speed silicon Mach-Zehnder modulator," Optics Express, vol. 13, No. 8, Apr. 18, 2005, pp. 3129-3135.

Liu et al., "Recent advances in high speed silicon optical modulator," Proc. of SPIE vol. 6477, (2007), pp. 1-9.

\* cited by examiner

US 9,256,028 B2

DISPERSION-CORRECTED ARRAYED WAVEGUIDE GRATING

This application is a national stage application of PCT Application No. PCT/CN2012/070357, filed on Jan. 14, 2012, which claims the benefit of U.S. Provisional Application No. 61/432,916, entitled "Dispersion corrected array-waveguide grating in silicon-on-insulator lightwave circuits," by Bing Li, and filed on Jan. 14, 2011, the entire content of which is incorporated herein by reference.

TECHNICAL FIELD

The disclosure relates to planar lightwave circuits and, more particularly, to arrayed waveguide gratings.

BACKGROUND

An arrayed waveguide grating (AWG) is a device that, via dispersion, is used to separate (demultiplex) or combine (multiplex) different optical wavelengths in, for example, wavelength-divisional multiplexing (WDM) systems. In an AWG, a flat transmission passband is desirable. That is, it is desirable that the AWG provides a uniform diffraction angle for all wavelengths inside each passband. However, the dispersion of the waveguide array, which is the mechanism that allows the AWG to separate or combine different optical wavelengths, prevents a truly uniform transitivity inside the passband.

SUMMARY

In general, this disclosure describes a planar lightwave circuit that utilizes a dispersion-corrected arrayed waveguide grating (AWG). In particular, this disclosure describes an AWG having a waveguide array in combination with a concave reflective diffraction grating, where each waveguide of the waveguide array follows a path defined by an arc length of a circle having a different radius with respect to the other waveguides of the waveguide array, and where each of the circles are positioned concentrically. Using the techniques of this disclosure, overall performance and efficiency of the circuit, including insertion loss, is improved over existing techniques.

In one example, this disclosure is directed to an arrayed waveguide grating comprising at least one input waveguide, a first slab waveguide coupled to an output of the input waveguide, a concave reflective mirror coupled to the first slab waveguide, a parallel mode converter coupled to the first slab waveguide, a waveguide array coupled to an output of the parallel mode converter, wherein the waveguide array comprises a first waveguide and a second waveguide, wherein the first waveguide of the waveguide array follows a first path defined by an arc length of a first circle having a first radius, wherein the second waveguide of the waveguide array follows a second path defined by an arc length of a second circle having a second radius, wherein the first radius is different from the second radius, and wherein the first and second circles are positioned concentrically. The arrayed waveguide grating further comprises a second slab waveguide coupled to an output of the waveguide array, a concave reflective diffraction grating coupled to an output of the second slab waveguide, and a plurality of output waveguides coupled to the concave reflective diffraction grating.

In another example, this disclosure is directed to an arrayed waveguide grating comprising at least one input waveguide, a parallel mode converter coupled to the at least one input waveguide, wherein the parallel mode converter comprises ridges, and wherein the ridges are arranged in a fan-out arrangement, and a waveguide array coupled to an output of the parallel mode converter, wherein the waveguide array comprises a first waveguide and a second waveguide, wherein the first waveguide of the waveguide array follows a first path defined by a first bended length and first bend angle, wherein the second waveguide of the waveguide array follows a second path defined by a second bended length and second bend angle, wherein the first bended length is different from the second bended length and wherein the first bend angle is different from the second bend angle. The arrayed waveguide grating further comprises a second slab waveguide coupled to an output of the waveguide array, a concave reflective diffraction grating coupled to an output of the second slab waveguide, and a plurality of output waveguides coupled to the concave reflective diffraction grating.

The details of one or more aspects of the disclosure are set forth in the accompanying drawings and the description below. Other features, objects, and advantages will be apparent from the description and drawings, and from the claims.

DETAILED DESCRIPTION

An arrayed waveguide grating (AWG) is a device that, via dispersion, separates (demultiplex) or combines (multiplex) different optical wavelengths in, for example, wavelength-divisional multiplexing (WDM) systems. After the input lightwave beam couples into the waveguide array portion of an AWG and be separated into many channels, because the length of each of the waveguides (or channels) in the waveguide array is different, the lightwave beams coming out of those channels at the end of the waveguide array have phase differences between them. This phase differences will be added on top of the initial phase differences at the input end. For example, if the input side the beams are in-phase and the length difference between channels are linear across the array, there may be a linear phase distribution from the innermost side to the outermost side of the array.

The dispersion in a traditional waveguide array prevents a flat passband. That is, the diffraction angle changes across a passband such that the wavelengths across the passband are directed at different angles and thus cannot be received at the same efficiency by the receiving waveguide. In general, there is one receiving waveguide (i.e., output waveguide) corresponding to one passband. However, the position of that receiving waveguide corresponds to the center wavelength of the passband. The different diffraction angles within the passband cause the light not at the center wavelength to enter the receiving waveguide with an offset in both position and incident angle. Therefore, light not at the center wavelength cannot be coupled to the waveguide at the best efficiency. The further the light is from the center wavelength, the worse the efficiency of the coupling, until it is completely off. Using the techniques of this disclosure, the dispersion within the passband inherent in traditional waveguide arrays is corrected such that a flat transmission passband is achieved, which is desired in the most of applications. In addition, the techniques of this disclosure will thereby improve the overall performance and efficiency of the circuit over existing techniques, including insertion loss, for example.

Figure 1:
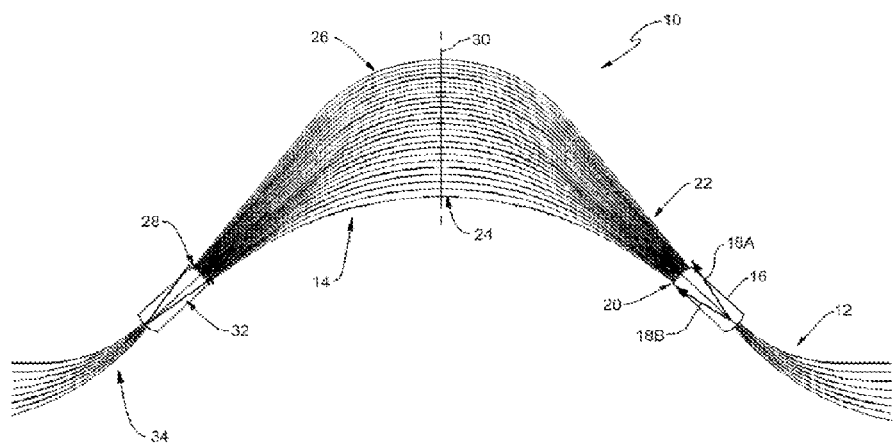
FIG. 1 is a schematic view of a traditional arrayed waveguide grating.

FIG. 1 is a schematic view of a traditional arrayed waveguide grating, shown generally at 10. From right to left in FIG. 1, one or more input waveguides 12 transmit lightwaves comprising two or more wavelengths toward the waveguide array, shown generally at 14. The lightwaves from input waveguides 12 enter first free space region 16 (a slab waveguide), which causes the lightwaves to be divergent, as illustrated by lines 18A and 18B. First free space region 16 is coupled to waveguide array 14 at waveguide array input 20. Each of the wavelengths of the lightwaves is transmitted along each of the waveguides in waveguide array 14, with power divided among the waveguides (or channels) in waveguide array 14. The waveguides of waveguide array 14 are shown generally at 22.

As seen in FIG. 1, from innermost waveguide 24 of waveguide array 14 to outermost waveguide 26 of waveguide array 14, the waveguides increase in length. The difference in length between waveguides 22 of waveguide array 14 causes the wavelengths of the lightwaves transmitted along each of the waveguides in waveguide array 14 to be phase-shifted with respect to one another. The direction at which the lightwaves exit output 28 of waveguide array 14 depends on the phase difference between the waveguides in the waveguide array, which is determined by the difference in the length of the waveguides in relation to the wavelengths of the lightwave.

As seen in FIG. 1, at the midpoint of waveguide array 14, shown generally by line 30, each of the waveguides has a different bending angle, with innermost waveguide 24 having the smallest bend angle and outermost waveguide 26 having the largest bend angle. At input 20 of waveguide array 14, the waveguides are tightly compacted with respect to one another and then fan-out from the input toward the midpoint of waveguide array 14. After the midpoint, the waveguides of waveguide array 14 begin to compress toward each other and are tightly compacted with respect to one another at output 28 of waveguide array 14, thereby producing a focusing effect. Usually, at output 28, the waveguide ends are located along a circular arc, which is usually referred to as an aperture (or circular aperture), to enhance the focusing effect. Thus, the space between waveguides in waveguide array 14 of FIG. 1 is not equal across the length of waveguide array 14. Rather, the space between waveguides 22 of waveguide array 14 is greatest at midpoint 30 and smallest at input 20 and output 28.

Waveguide array 14 is coupled to second free space region 32 (a slab waveguide). The lightwaves exiting output 28 (i.e., the emitting aperture) of waveguide array 14 enter and traverse second free space region 32. The lightwaves interfere with one another, both destructively and constructively, in the imaging plane of the second free space region 32. In order to receive specific wavelengths, a plurality of output waveguides 34, which are coupled to the output of second free space region 32, needs to be positioned in relation to the lightwaves exiting waveguide array 14. In this manner, the two or more wavelengths of a lightwave entering AWG 10 via input waveguide 12 are separated and then transmitted along output waveguides 34. In such a configuration, AWG 10 performs a demultiplexing function. It should be noted that AWGs are often symmetric and, as such, AWG 10 may perform a multiplexing function. Traditional AWGs are well known to those of ordinary skill in the art and, as such, are not described in detail in this disclosure.

As indicated above, the dispersion of the waveguide array, which is the mechanism that allows the AWG to separate or combine different optical wavelengths, prevents a truly uniform transitivity inside a passband. That is, the diffraction angle may change so significantly across a passband such that the wavelengths across the passband are directed at different angles and thus cannot be received at the same efficiency by the receiving waveguide, as described above.

Figure 2:
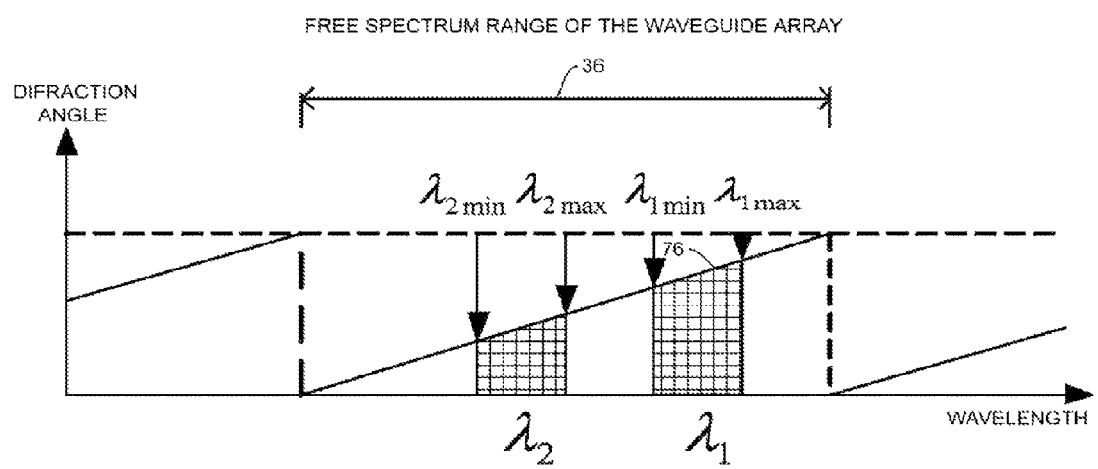
FIG. 2 is a graph illustrating the dispersion using a traditional waveguide array.

FIG. 2 is a graph conceptually illustrating the dispersion using a traditional waveguide array. In FIG. 2, the vertical axis represents the diffraction angle and the horizontal axis represents wavelength. FIG. 2 depicts two passbands, namely $\lambda_1$ and $\lambda_2$. Each passband includes numerous wavelengths. The $\lambda_1$ passband is bounded by $\lambda_{1min}$ and $\lambda_{1max}$, and the $\lambda_2$ passband is bounded by $\lambda_{2min}$ and $\lambda_{2max}$. The free spectrum range of the waveguide array is shown at 36. For the simplicity of the description, there is an approximation in FIG. 2: the diffraction angle increases (i.e., has a positive sign) approximately linearly with respect to the wavelength across entire free spectrum range 36.

In the $\lambda_1$ passband, $\lambda_{1min}$ has a first diffraction angle and $\lambda_{1max}$ has a second, greater diffraction angle. The dispersion, or linear change in diffraction angle between $\lambda_{1min}$ and $\lambda_{1max}$ has a first magnitude. In the $\lambda_2$ passband, $\lambda_{2min}$ has a third diffraction angle and $\mu_{2max}$ has a fourth, greater diffraction angle. The dispersion, or linear change in diffraction angle between $\lambda_{2min}$ and $\lambda_{2max}$ has a second magnitude.

All wavelengths within a passband should be directed to the same waveguide. But, because there is a difference in diffraction angles within a passband, as seen in FIG. 2, the different wavelengths in the passband cannot be received by the output waveguide with the same efficiency, as described above. One specific example of the effect of the change in diffraction angle, or dispersion, across a passband relates to passive-optical networks (PON). In one example PON, a coarse wavelength-divisional multiplexing (WDM) system is used to allow two downstream wavelength channels and one upstream wavelength channel share the same fiber link via a triplexer. The upstream channel of 1310 nm has a 100 nm bandwidth (e.g., 1260 nm to 1360 nm). A first downstream channel of 1490 nm (used for telephone and internet, for example) has a 20 nm bandwidth (e.g., 1480 nm to 1500 nm) and a second downstream channel of 1550 nm (used for overlaid video, for example) has a 10 nm bandwidth (e.g., 1550 nm to 1560 nm).

The wide bandwidth requirement of the upstream channel (100 nm) is used to accommodate the variation of the laser wavelength used on the optical network user (ONU) side. Because the bandwidth is so wide, however, a traditional AWG cannot be used to satisfy the requirement of the triplexer in a PON network. That is, because the diffraction angle changes significantly across the 100 nm bandwidth of the upstream channel in a PON, the wavelengths across the 100 nm bandwidth are directed at many different angles. Thus, a traditional AWG (i.e., without dispersion correction) cannot be used in a PON.

It should be noted that as the width of the passband increases, the width of the diffraction angle range also increases. A very wide waveguide may be positioned to receive all the diffraction angles, but the receiving efficiency into such a waveguide by different angles is still not uniform.

One technique exists to overcome the dispersion issue described above. In U.S. Pat. No. 7,068,885 to Bidnyk et al., two concave reflective diffraction gratings are placed in series to correct dispersions. However, because the efficiency of reflective gratings in a planar lightwave circuit is limited, the overall insertion loss performance is not optimal.

Using the techniques of this disclosure, the dispersion within the passband inherent in traditional AWGs is corrected such that a flat transmission within that passband is achieved, also improving the overall performance and efficiency of the circuit over existing techniques, including lower insertion loss, for example. As described in more detail below, the waveguide array of the current disclosure, in combination with a single concave reflective diffraction grating, corrects the dispersion within a passband, e.g., $\lambda_1$ passband or $\lambda_2$ passband, without losing angle steering between different channels ($\lambda_1$ and $\lambda_2$).

Figures 3, 4:
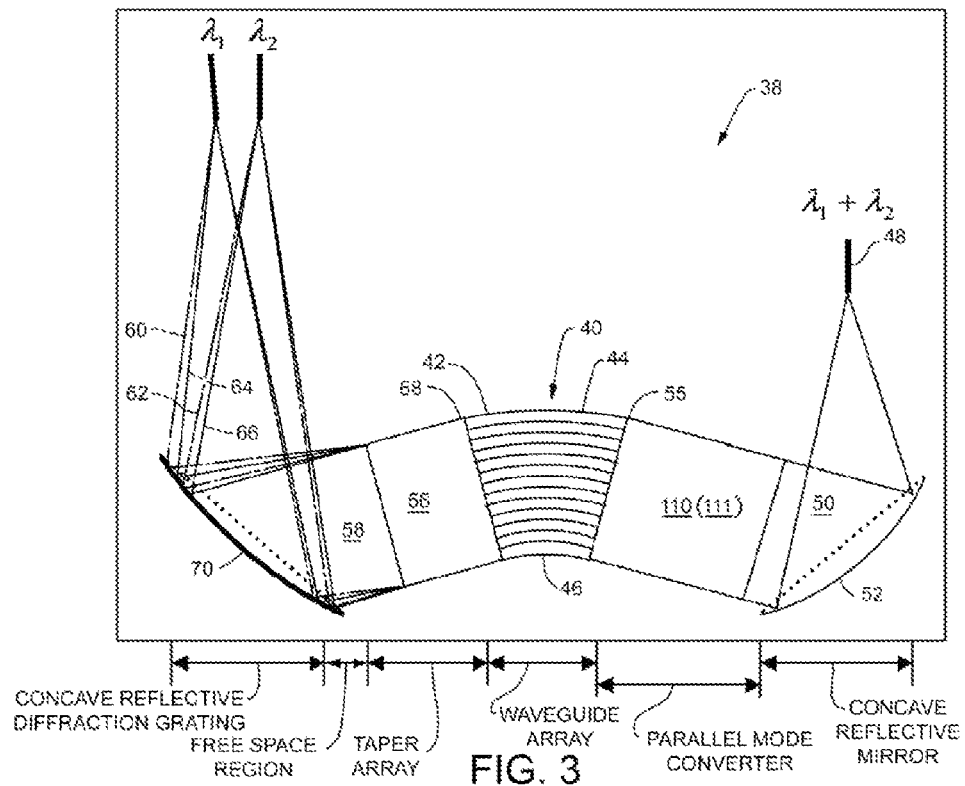
FIG. 3 is a schematic view of an example dispersion-corrected arrayed waveguide grating, in accordance with this disclosure.
FIG. 4 is a graph illustrating the dispersion caused by a concave reflective diffraction grating.

FIG. 3 is a schematic view of an example dispersion-corrected arrayed waveguide grating, in accordance with this disclosure. The dispersion-corrected AWG, shown generally at 38, includes waveguide array 40 having a plurality of waveguides 42. In contrast to the waveguide array shown in FIG. 1, each waveguide of waveguide array 40 in FIG. 3 follows a path defined by an arc length (i.e., portion) of a circle in a co-centered circle series, as shown and described in more detail below with respect to FIG. 9. That is, in accordance with this disclosure, each waveguide of waveguide array 40 follows a path defined by an arc length (i.e., portion) of a circle, where each waveguide 42 of waveguide array 40 follows a path defined by an arc length of a circle of different radius with respect to the other waveguides 42 of waveguide array 40, and where each of the circles are co-centered, or positioned concentrically. In FIG. 3, outermost waveguide 44 of waveguide array 40 follows a path defined by an arc length positioned on a circle having the greatest radius of the circle series and innermost waveguide 46 of waveguide array 40 follows a path defined by an arc length positioned on a circle having the smallest radius of the circle series. In contrast to traditional waveguide array 14 of FIG. 1, the smallest length difference that can be achieved by waveguide array 14 of FIG. 1 is limited; the smallest length difference that can be achieved by waveguide array 40 of FIG. 3 can approach to zero. Therefore, the free spectrum range of waveguide array 40 can be any number.

The entire AWG device 38 of FIG. 3 is constructed within a planar guiding film. In the example depicted in FIG. 3, input waveguide 48 transmits a lightwave comprising two wavelengths, namely $\lambda_1$ and $\lambda_2$. The output of input waveguide 48 is coupled to first free space region 50 (or first slab waveguide 50), which has no lateral confinement. As the lightwave is transmitted through first free space region 50, the lightwave diverges. Concave reflective mirror 52, coupled to first slab waveguide 50, converts the divergent lightwave into a lateral, collimated beam. That is, the light rays of the beam reflected by concave reflective mirror 52 are in parallel.

The lateral collimated beam is transmitted to parallel mode converter 110, which is coupled to first slab waveguide 50. Parallel mode converter 110 separates the incoming single collimated beam into multiple waveguide channels. An example parallel mode converter is shown and described in more detail below with respect to FIG. 7 and FIG. 8A. Additional information regarding parallel mode converter 110 may be found in U.S. Pat. No. 7,668,416 to Bing Li, the entire content of which is incorporated herein by reference.

When the device is used as a de-multiplexer from right to left of FIG. 3 (and multiplexer from left to right), the collimated beam coupled to the waveguide array 40 excited in-phase beams in each channels, the parallel mode converter is an optional element to reduce the insertion loss of the whole device. When the device is used as a multiplexer from right to left, the parallel mode converter shall not be used or must be replaced by a taper array in which there is no or little coupling between the channels.

Figure 9:
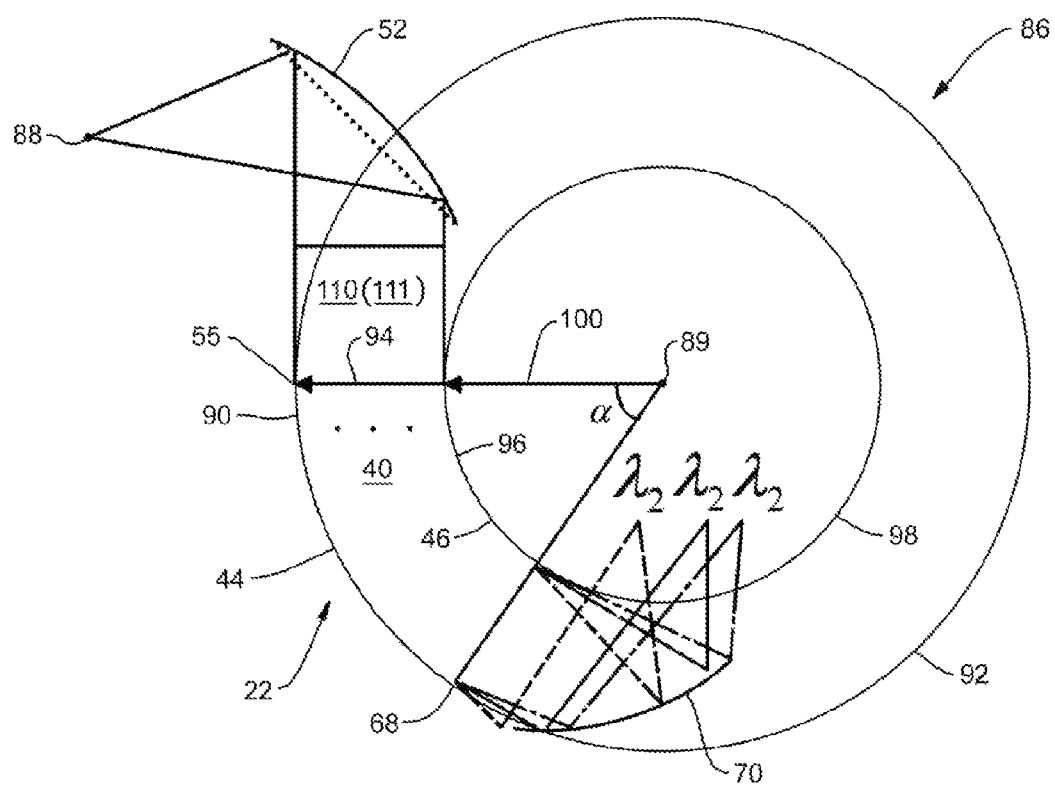
FIG. 9 is a conceptual diagram illustrating an example co-centered circle series that may be used to implement various techniques of this disclosure.

Input 55 of waveguide array 40, shown and described in more detail below with respect to FIG. 9, is coupled to the output of parallel mode converter 110. Waveguide array 40 introduces a desired phase shift along the longitudinal length of the waveguide array, which diffracts the different wavelengths, e.g., $\lambda_1$ and $\lambda_2$, in different directions.

Optionally, AWG 38 of FIG. 3 includes taper array 56, which is coupled to the output of waveguide array 40. If present, taper array 56 converts the waveguide mode in each channel to a mode where most of the power is confined in the slab region of the ridge channel waveguide, therefore to reduce the scattering loss at the output end of the waveguide array 40. It should be noted that, in contrast to parallel mode converter 110, there should be no mode coupling between the channels of taper array 56, if possible.

Figure 8A:
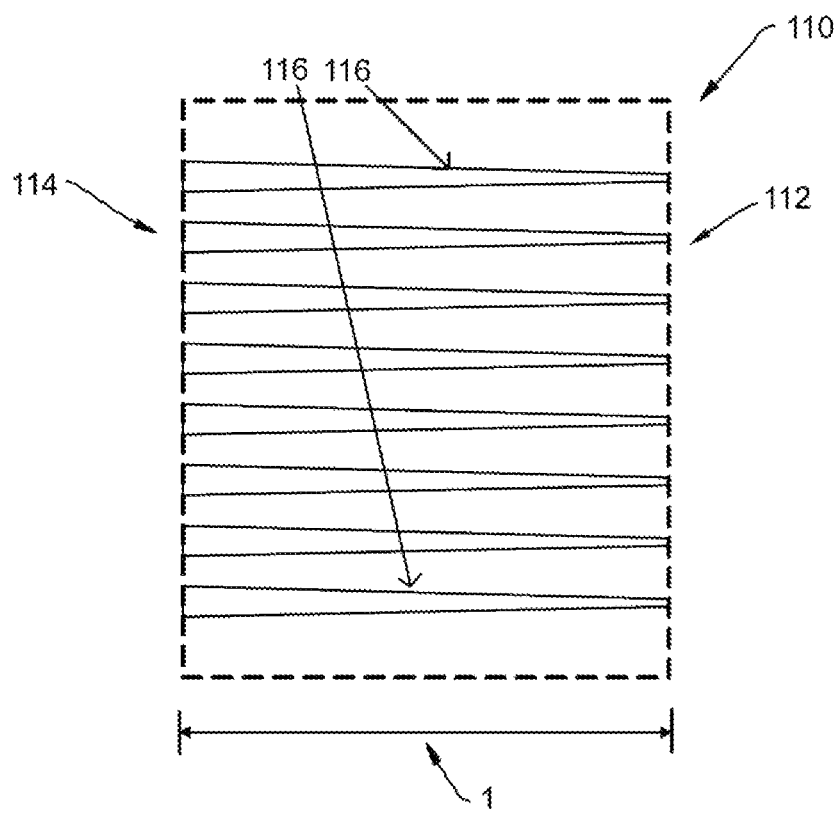
FIG. 8A is a conceptual diagram illustrating another example parallel mode converter that may be used to implement various techniques of this disclosure.
Figure 8B:
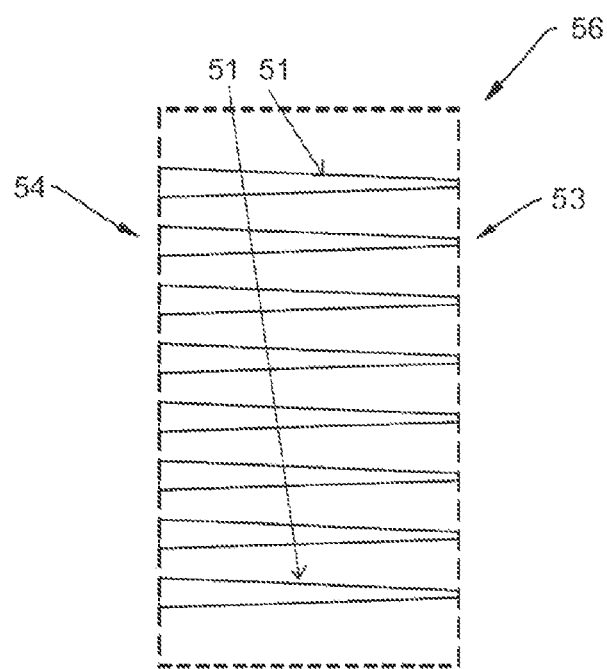
FIG. 8B is a conceptual diagram illustrating one example taper array that may be used to implement various techniques of this disclosure.

In one example configuration, taper array 56 is similar in structure to that shown in FIG. 8B. As seen in FIG. 8B, taper array 56 comprises an input and output, shown generally at 54 and 53, respectively, and comprises one or more taper array ridges 51. Taper array ridges 51 are aligned with one another in parallel, wherein the width at the input 54 of the taper array ridges 51 is greater than that of the output 53 of the taper array ridges 51. Desirably, the length of taper array 56 is short enough to ensure that there is no or little coupling between waveguides due to the fact that the coupling needs length to accumulate. This is desired because the coupling between the channels in the taper array will ruin the phase independency of each channel which has to be reserved in and after the waveguide array 40.

Optional taper array 56 is coupled to second free space region 58. It should be noted that if taper array 56 is not present, then waveguide array 40 may be coupled directly to second free space region 58.

The parallel beam outputs of taper array 56 or the waveguide array 40 shine at different angles according to the wavelength transmitted, as described above. In FIG. 3, two beams are illustrated, namely $\lambda_1$ and $\lambda_2$. As shown and described above with respect to FIG. 2, however, each wavelength $\lambda_1$ and $\lambda_2$ represents a passband. In FIG. 3, dashed beam lines, e.g., lines 60, 62, correspond to the shorter edge of the passband, e.g., $\lambda_{1min}$ and $\lambda_{2min}$, and solid beam lines, e.g., lines 64, 66, correspond to the longer edge of the passband, e.g., $\lambda_{1max}$ and $\lambda_{2max}$. At output 68 of waveguide array 40, beams corresponding to dashed beam lines 60, 62 will have different diffraction angles than beams corresponding to solid beam lines 64, 66.

In accordance with various techniques of this disclosure, dispersion correction is accomplished using concave reflective diffraction grating 70 after second free space region 58. Concave reflective diffraction grating 70 focuses the parallel beams back to a single point, and other than that, more importantly, the concave reflective diffraction grating 70 corrects the diffraction difference within each band.

Concave reflective diffraction grating 70 includes a free spectrum range having a range of wavelengths that is equal to the width of the passband, which causes concave reflective diffraction grating 70 to introduce the same dispersion within both the $\lambda_1$ passband and the $\lambda_2$ passband. Introducing the same dispersion within both the $\lambda_1$ passband and the $\lambda_2$ passband corrects the dispersion within the passband of $\lambda_1$ and $\lambda_2$ previously generated by waveguide array 40, but will not cancel the dispersion between $\lambda_1$ and $\lambda_2$. The dispersion of waveguide array 40 was described above with respect to FIG. 2. The correction of the dispersion of waveguide array 40 using concave reflective diffraction grating 70 is shown and described below with respect to FIGS. 4 and 5.

FIG. 4 is a graph illustrating the dispersion caused by a concave reflective diffraction grating. In particular, FIG. 4 depicts the dispersion caused by concave reflective diffraction grating 70 of FIG. 3. In FIG. 4, the vertical axis represents the diffraction angle and the horizontal axis represents wavelength. The free spectrum range of the concave reflective diffraction grating is shown at 72. Using the techniques of this disclosure, concave reflective diffraction grating 70 is configured to have a dispersion with the opposite sign but the same magnitude as waveguide array 40 such that, in combination, concave reflective diffraction grating 70 and waveguide array 40 result in a flat transmission passband, as shown and described below with respect to FIG. 5.

As seen in FIG. 4, the diffraction angle decreases approximately linearly (i.e., has a negative sign) with respect to the wavelength. Further, the change in diffraction angle changes repeatedly and periodically. The linear change, i.e., slope, in diffraction angle caused by concave reflective diffraction grating 70 has a magnitude that is equal to the magnitude of linear change in diffraction angle caused by waveguide array 40 of FIG. 3. Please note that FIG. 2 also illustrates the dispersion of the waveguide array 40 of FIG. 3, in which the free spectrum range of the waveguide array 40 is shown at 36. In addition, the linear change in diffraction angle is opposite to the linear change in diffraction angle caused by waveguide array 40 of FIG. 3. That is, the first sign (e.g., positive) of the linear change caused by waveguide array 40 of FIG. 3 is opposite the second sign (e.g., negative) of linear changes caused by concave reflective diffraction grating 70. In other words, in FIG. 4 slope 74 across a free spectrum range of concave reflective diffraction grating 70 is equal and opposite to slope 76 (FIG. 2) across a passband, e.g., $\lambda_1$ passband, in FIG. 2.

In one example, the free spectrum region 72 of concave reflective diffraction grating 70 is equal to the passband in the system. In such an example, concave reflective diffraction grating 70 only corrects the dispersion within the passband, without causing an angle steering between different channels, e.g., between $\lambda_1$ and $\lambda_2$.

Figure 5:
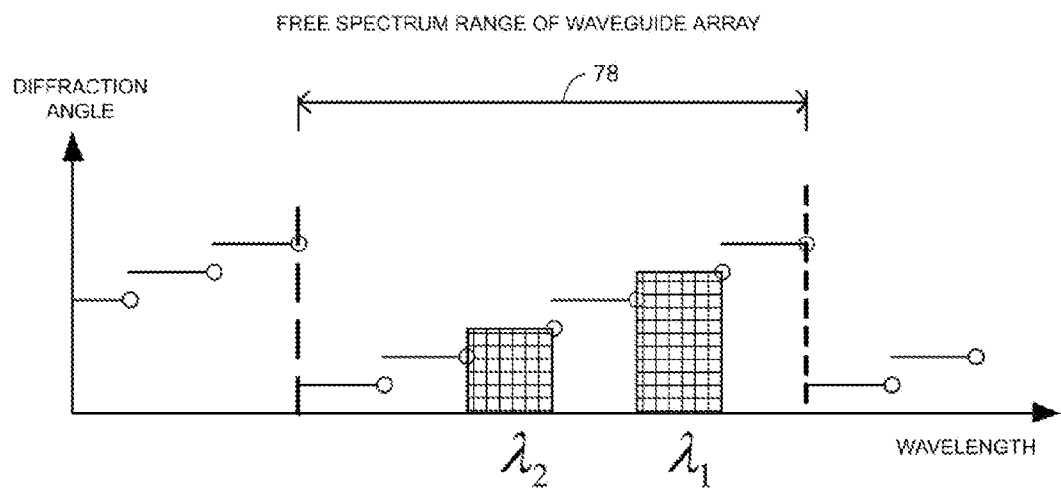
FIG. 5 is a graph illustrating the dispersion correction of the arrayed waveguide grating of this disclosure.

FIG. 5 is a graph illustrating the dispersion correction of the arrayed waveguide grating of this disclosure. In particular, FIG. 5 represents the graphical combination of the dispersion of a waveguide array, shown graphically in FIG. 2, and the dispersion of a concave reflective diffraction grating, shown graphically in FIG. 4. The free spectrum range of the waveguide array is shown at 78. Please note that the FSR 78 is the same as the FSR 36 in FIG. 2, which is also the free spectrum range of the waveguide array 40 in FIG. 3. In FIG. 5, the vertical axis represents the diffraction angle and the horizontal axis represents wavelength. The combination of the dispersion of the waveguide array with the dispersion of a concave reflective diffraction grating, which is equal and opposite in magnitude to the dispersion of the waveguide array, results in flat transmission passbands across passbands $\lambda_1$ and $\lambda_2$. In other words, using waveguide array 40 in combination with concave reflective diffraction grating 70 results in flat transmission passbands.

Figure 6A:
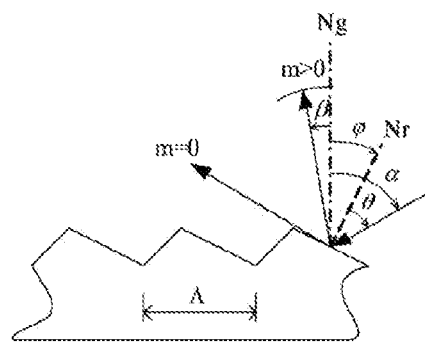
FIGS. 6A and 6B are schematic views of portions of concave reflective diffraction gratings that may be used to implement various techniques of this disclosure.
Figure 6B:
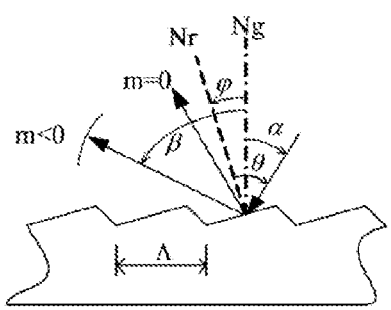

FIGS. 6A and 6B are schematic views of portions of concave reflective diffraction gratings that may be used to implement various techniques of this disclosure. FIG. 6A depicts a portion of a concave reflective diffraction grating using a positive order of diffraction and FIG. 6B depicts a portion of a concave reflective diffraction grating using a negative order of diffraction. According to equation (1), i.e., the grating diffraction equation, $$m\lambda = \Lambda(\sin\alpha + \sin\beta) \quad (1)$$

where m is the order of diffraction, $\lambda$ is the wavelength of the incident beam, $\Lambda$ is the grating lattice constant, $\alpha$ is the angle of incident light relative to the normal of the grating surface, and $\beta$ is the angle of diffraction relative to the normal of the grating surface.

Assume that the two normal lines, namely the grating normal ($N_g$) and the normal line of the local surface ($N_r$), are separated by an angle $\phi$. In order to have high diffraction efficiency, one should choose $\phi - \beta = \theta$ so that the chosen order of diffraction m is in the direction of the local surface's reflection, where $\theta$ is the angle between the incident beam and the normal line of the local surface ($N_r$).

As one example, to have a free spectrum range of 50 nm ($\lambda_{1min}$ and $\lambda_{2max}$, wavelength in free-space), then $\lambda_{2max}*(m+2) = \lambda_{1min}*m$, so m=30, and the grating lattice constant $\Lambda$ should be approximately equal to in m·1550/3.45 ≅ 13 μm. For $\beta = 45°$, the diffraction angle $\beta$ versus the wavelength $\lambda$, i.e., angular dispersion, is determined according to equation (2), $$\frac{d\beta}{d\lambda} = \frac{m}{\Lambda\cos\beta} \cong (-)3.26 \ \mu m^{-1} \quad (2)$$

As seen in equation (2), the angular dispersion, i.e., the angle change per unit wavelength change, is inversely proportional to the grating lattice constant $\Lambda$. It should be noted that the sign of the angular dispersion ($-3.26 \ \mu m^{-1}$) depends on the order m. Due to the fact that the waveguide array 40 in FIG. 3 will have a dispersion with a positive sign, the reflective grating for the dispersion correction shall have a negative diffraction order, e.g., the portion depicted in FIG. 6B.

In some example implementations, the entire AWG is fabricated from silicon-on-insulator planar wave-guiding film. In one example, the concave reflective diffraction gratings of FIGS. 6A and 6B may be fabricated by fully etching the silicon-on-insulator ("SOI") planar guiding film.

In addition, reflective concave mirror 52 in FIG. 3 may be fabricated by fully etching (deep etching) the SOI planar guiding film to the buried oxide layer to create a vertical smooth side wall for the SOI guiding film, thereby allowing total reflection to occur for the lightwave propagation within the silicon film. Due to the large contrast between the refraction indices of the silicon and the silicon-dioxide (also referred to as "oxide" in this disclosure) or other cladding material such as silicon nitride (SiN), the total reflection angle is quite small so that the side wall functions as a 100% reflective mirror for a wide range of incident angles.

The total reflection incident angle threshold, $\theta_T$, is determined by equation (3) below. Assuming a silicon refractive index of 3.45 and an oxide refractive index of 1.44, then $$\theta_T = \arcsin\left(\frac{n_{oxide}}{n_{silicon}}\right) \cong 25° \qquad (3)$$

Thus, as long as the incident angle is greater than approximately 25°, the vertical side wall functions as a mirror.

Figure 7:
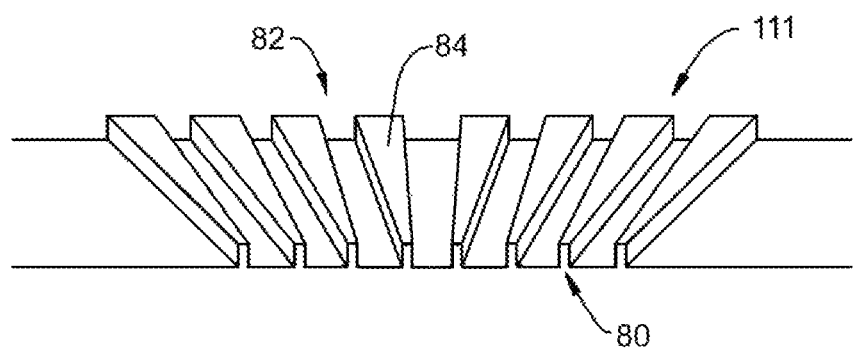
FIG. 7 is a conceptual diagram illustrating one example parallel mode converter that may be used to implement various techniques of this disclosure.

Parallel mode converter 110,111 or taper array 56 may be a multi-ridge waveguide fabricated by partially etching the original SOI film. FIG. 7 is a conceptual diagram illustrating one example fan-out parallel mode converter that may be used to implement various techniques of this disclosure. As shown in FIG. 7, parallel mode converter 111 includes an input and output, shown generally at 80 and 82, respectively, and includes one or more ridges 8. Along the multi-ridge waveguide, the width of ridges 84 and the spacing between ridges 84 vary, thereby allowing a supermode conversion to occur.

FIG. 8A is a conceptual diagram illustrating an example parallel mode converter that may be used to implement various techniques of this disclosure. In particular, FIG. 8A depicts an example parallel mode converter 110 that may be used in AWG 38 of FIG. 3 when concave reflective mirror 52 is used to collimate the beam from input waveguide 48 (FIG. 3). Parallel mode converter 110 includes an input and output, shown generally at 112 and 114, respectively, and includes one or more ridges 116. In the example parallel mode converter 110 of FIG. 8A, the ridges are in parallel, in contrast to the fan-out arrangement of FIG. 7.

It should be noted, however, that if concave reflective mirror 52 is not used, the ridges of parallel mode converter need to be in a fan-out arrangement, as shown in FIG. 7. In such a configuration, the parallel mode converter 110 in FIG. 3 needs to be replaced by the parallel mode converter 111. However, the consequence is that the waveguides of waveguide array 40 cannot be positioned in a co-centered circle series in the manner described below with respect to FIG. 9 and, instead, should be arranged more like in a traditional AWG (FIG. 1), i.e., the waveguide array comprises a first waveguide and a second waveguide, where the first waveguide of the waveguide array follows a first path defined by a first bended length, where the second waveguide of the waveguide array follows a second path defined by a second bended length, and where the first bended length is different from the second bended length. For example, as seen in FIG. 1, the starting point of each of the waveguides of waveguide array 14 are located along a segment of circle, and therefore, each of the waveguide of waveguide array 14 has a different starting angle and tends to separate more. Due to the fact that all waveguides of waveguide array 14 must come back together at the end, waveguides of the waveguide array 14 have different bending angles, with innermost waveguide 24 having the smallest bending angle (i.e., bent less than the other waveguides) and outermost waveguide 26 having the largest bending angle (i.e., bent more than the other waveguides).

The splitting of the collimated beam by parallel mode converter 110 releases the constraints to waveguide array 40 in terms of generating length differences between adjacent waveguides along the length of the waveguide array. The constraints of generating small length differences in traditional waveguide arrays can be explained with respect to FIG. 1. Due to the fact that the lightwave splitting is a fan-out splitting among the arrays in traditional waveguide arrays, the overall bending angle of the outer waveguide must be larger than the inner waveguide. The bending angle difference between adjacent waveguides limits the smallest length difference achievable by the array, which, in turn, reduces the achievable spectrum range.

Using the techniques of this disclosure, the smallest length difference achievable by a waveguide array is reduced over traditional waveguide arrays. The smaller length difference helps generate larger free spectrum range. In addition, the smaller length difference enlarges the design space, helping to make smaller and higher performance devices.

FIG. 9 is a conceptual diagram illustrating a co-centered circle series that may be used to implement various techniques of this disclosure. Because parallel mode converter 110 (FIG. 3) causes collimated beam splitting, the dispersion-corrected AWG of this disclosure, e.g., AWG 38 of FIG. 3, can have waveguide array 40 of FIG. 3 placed along a co-centered circle series, as generally shown in FIG. 9 at 86.

FIG. 9 depicts concave reflective mirror 52, which converts the divergent lightwave at input 88 into a lateral, collimated beam, and then transmits the beam to parallel mode converter 110. Parallel mode converter 110 separates the incoming single collimated beam into multiple waveguide channels. In FIG. 9, the free space before the concave reflective diffraction grating 70 is coupled directly to waveguide array 40. However, as described above, a taper array, e.g., taper array 56, may also be included and coupled to the output of waveguide array 40.

In accordance with this disclosure, each waveguide 22 of waveguide array 40 follows an arc length of a circle in a co-centered circle series. That is, each waveguide 22 of waveguide array 40 follows a path defined by an arc length of a circle, where each waveguide (or channel) of waveguide array 40 follows a path defined by an arc length of a circle of different radius with respect to the other waveguides 22 of waveguide array 40, and where each of the circles are co-centered, or positioned concentrically (sharing common center 89). Each waveguide of waveguide array 40 has a sequentially varied length along the array, which introduces a linear phase distribution along its output aperture.

Waveguide array 40 of FIG. 9 comprises a first waveguide, e.g., outer waveguide 44, and a second waveguide, e.g., inner waveguide 46. The first waveguide of waveguide array 40 follows a first path defined by an arc length 90 of a first circle, e.g., circle 92, having a first radius 94 and the second waveguide of the waveguide array follows a second path defined by an arc length 96 of a second circle, e.g., circle 98, having a second radius 100, where the first radius is different from the second radius. For clarity, the co-centered circle series 86 depicted in FIG. 9 includes two circles, namely circles 92 and 98. However, there may be 10 circles, 50 circles, 100 circles, or more depending on the number of channels of waveguide array 40.

The length difference between adjacent waveguides in a waveguide array is determined by equation (4) below:

$$dL = dR \cdot \alpha = dR \cdot L/R \qquad (4)$$

where, dL is the length difference between the adjacent waveguides in the array, dR is the spacing between the waveguides, L is the average length of the waveguide array, R is the average radius of the circles series in question, and α is the angle between input 55 and output 68 of waveguide array 40.

As seen in FIG. 9 and using equation (4), given the average length L and the spacing dR, any desired length difference dL between adjacent waveguides in waveguide array 40 is achievable without the penalty of enlarging the device size. In one example implementation, the angle α between input 55 and output 68 of waveguide array 40 is 18 degrees, R is 2500 microns, and spacing dR is 10 microns. Given that α is 18 degrees (0.314159 radians) and that spacing dR is 10 microns, then, from equation (4), the length difference dL between adjacent waveguides in the array equals dL=dR·α=0.314159 radians*10 microns=3.14159 microns. It should be noted that waveguide array 40 may be a ridge waveguide array fabricated by partially etching the original SOI film.

Dispersion correction in AWG 38 is accomplished by including (e.g., implanting, embedding) concave reflective diffraction grating 70 after second free space region 58. Concave reflective diffraction grating 70 compensates the angle steering within a passband and focuses the parallel beams back to a single point.

To summarize, in contrast to the AWG structure in U.S. Pat. No. 7,068,885 to Bidnyk et al. mentioned above, which uses a double concave reflective diffraction grating structure (two concave reflective diffraction grating placed in series), the dispersion-correction AWG described in this disclosure, e.g., AWG 38 of FIG. 3, embeds (implements) a single concave reflective diffraction grating in a array-waveguide grating to comprise a dispersion corrected array-waveguide grating structure. A planar beam collimation system comprising by a free space region and a concave mirror built in a planar guiding film is also introduced to eliminate the need for a fan-out waveguide array. Each waveguide of the waveguide array can follow an arc length of a circle, where each waveguide of the waveguide array follows an arc length of a circle of different radius with respect to the other waveguides of the waveguide array, and where each of the circles are co-centered, or positioned concentrically. The dispersion-corrected AWG of this disclosure has better throughput efficiency then that of existing techniques, e.g., the double concave reflective diffraction grating structure. In addition, the AWG of this disclosure removes the length difference constraint in a regular AWG structure. Further, unlike the existing double concave reflective diffraction grating structure disclosed in U.S. Pat. No. 7,068,885, the AWG of this disclosure may include any optical path length difference between the waveguides of the waveguide array without the bonding with the incident angle and other design parameters.

Various aspects of the disclosure have been described. These and other aspects are within the scope of the following claims.

The invention claimed is:

1. An arrayed waveguide grating comprising:
   at least one input waveguide;
   a first free space region of a first slab waveguide coupled to an output of the input waveguide;
   a concave reflective mirror coupled to the first free space region of the first slab waveguide;
   a parallel mode converter coupled to the concave reflective mirror through the first free space region of the first slab waveguide;
   a waveguide array coupled to an output of the parallel mode converter,
      wherein the waveguide array comprises a first waveguide and a second waveguide,
      wherein the first waveguide of the waveguide array follows a first path defined by an arc length of a first circle having a first radius,
      wherein the second waveguide of the waveguide array follows a second path defined by an arc length of a second circle having a second radius,
      wherein the first radius is different from the second radius, and
      wherein the first and second circles are positioned concentrically;
   a second free space region of a second slab waveguide coupled to an output of the waveguide array;
   a concave reflective diffraction grating coupled to an output of the second free space region of the second slab waveguide; and
   a plurality of output waveguides coupled to the concave reflective diffraction grating through the second free space region of the second slab waveguide.

2. The arrayed waveguide grating of claim 1, wherein the parallel mode converter comprises ridges, and wherein the ridges are aligned with one another in parallel.

3. The arrayed waveguide grating of claim 1, further comprising:
   a taper array positioned between the output of the waveguide array and the second free space region, wherein the taper array coverts an individual waveguide mode to a slab-confined profile.

4. The arrayed waveguide grating of claim 3, wherein the taper array comprises taper array ridges, and wherein the taper array ridges are aligned with one another in parallel.

5. The arrayed waveguide grating of claim 1, wherein the entire grating is fabricated from silicon-on-insulator waveguide film.

6. The arrayed waveguide grating of claim 5, wherein the parallel mode converter and the said waveguide array each comprise ridge waveguides made by partially etching the silicon-on-insulator film.

7. The arrayed waveguide grating of claim 5, wherein the concave reflective mirror and the concave reflective diffraction grating are fabricated by fully etching the silicon-on-insulator film, and wherein the full etching produces a vertical side wall on the silicon thereby allowing total reflection to occur for the lightwave propagating within the silicon film.

8. An arrayed waveguide grating comprising:
   at least one input waveguide;
   a parallel mode converter arranged to receive an optical signal from said input waveguide;
   a waveguide array coupled to an output of the parallel mode converter, said waveguide array comprising a first waveguide and a second waveguide;
   a dispersion correction portion coupled to an output of said waveguide array; and
   a plurality of output waveguides coupled to the dispersion correction portion;
   wherein said dispersion correction portion comprises a concave reflective diffraction grating.

9. An arrayed waveguide grating comprising:
   a waveguide array,
      wherein the waveguide array comprises a first waveguide and a second waveguide,
      wherein the first waveguide of the waveguide array follows a first path defined by an arc length of a first circle having a first radius,
      wherein the second waveguide of the waveguide array follows a second path defined by an arc length of a second circle having a second radius,
      wherein the first radius is different from the second radius, and
   wherein the first and second circles are positioned concentrically;

a second free space region of a second slab waveguide coupled to an output of the waveguide array; and a concave reflective diffraction grating coupled to an output of the second free space region of the second slab waveguide, wherein the waveguide array has a first dispersion having a first sign and a first magnitude and a first free spectrum range, wherein the concave reflective diffraction grating has a second dispersion having a second sign and a second magnitude and a second free spectrum range, wherein the first free spectrum range is larger than at least twice of the second free spectrum range, and the second sign is opposite the first sign, and wherein the second magnitude equals the first magnitude such that, in combination, the concave reflective diffraction grating and the waveguide array result in a flat dispersion curve within the second free spectrum range and a step dispersion curve within the first free spectrum range.

10. An arrayed waveguide grating comprising:

at least one input waveguide;

a first free space region of a first slab waveguide coupled to the input waveguide;

a parallel mode converter coupled to the first free space region of the first slab waveguide, wherein the parallel mode converter comprises ridges, and wherein the ridges are arranged in a fan-out arrangement;

a waveguide array coupled to an output of the parallel mode converter, wherein the waveguide array comprises a first waveguide and a second waveguide, wherein the first waveguide of the waveguide array follows a first path defined by a first bended length and first bend angle, wherein the second waveguide of the waveguide array follows a second path defined by a second bended length and second bend angle, and wherein the first bended length is different from the second bended length, and wherein the first bend angle is different from the second bend angle;

a second free space region of a second slab waveguide coupled to an output of the waveguide array;

a concave reflective diffraction grating coupled to an output of the second free space region of the second slab waveguide; and a plurality of output waveguides coupled to the concave reflective diffraction grating.

11. An arrayed waveguide grating comprising:

at least one input waveguide;

a parallel mode converter arranged to receive an optical signal from said input waveguide;

a waveguide array coupled to an output of the parallel mode converter, said waveguide array comprising a first waveguide and a second waveguide;

a dispersion correction portion coupled to an output of said waveguide array;

a plurality of output waveguides coupled to the dispersion correction portion; and a taper array positioned between the output of the waveguide array and the dispersion correction portion.

12. An arrayed waveguide grating comprising:

at least one input waveguide;

a parallel mode converter arranged to receive an optical signal from said input waveguide;

a waveguide array coupled to an output of the parallel mode converter, said waveguide array comprising a first waveguide and a second waveguide;

a dispersion correction portion coupled to an output of said waveguide array; and a plurality of output waveguides coupled to the dispersion correction portion;

wherein the first waveguide of the waveguide array follows a first path defined by an arc length of a first circle having a first radius, the second waveguide of the waveguide array follows a second path defined by an arc length of a second circle having a second radius, the first radius is different from the second radius.

13. The arrayed waveguide grating of claim 12, wherein the first and second circles are positioned concentrically.

14. An arrayed waveguide grating comprising:

at least one input waveguide;

a parallel mode converter arranged to receive an optical signal from said input waveguide;

a waveguide array coupled to an output of the parallel mode converter, said waveguide array comprising a first waveguide and a second waveguide;

a dispersion correction portion coupled to an output of said waveguide array;

a plurality of output waveguides coupled to the dispersion correction portion; and a first free space region of a first slab waveguide coupled to an output of the input waveguide, said parallel mode converter coupled to the first free space region of the first slab waveguide.

15. The arrayed waveguide grating of claim 14, comprising a concave reflective mirror coupled to the first free space region of the first slab waveguide, said parallel mode converter coupled to the concave reflective mirror.

16. The arrayed waveguide grating of claim 14, comprising a second free space region of a second slab waveguide coupled to an output of the waveguide array, said dispersion correction portion coupled to the second free space region of the second slab.

17. The arrayed waveguide grating of claim 16, wherein said dispersion correction portion comprises a concave reflective diffraction grating.

* * * * *